Feb. 9, 1932. F. DEUTSCH 1,844,214
PISTON RING EXPANDER
Filed Jan. 19, 1931
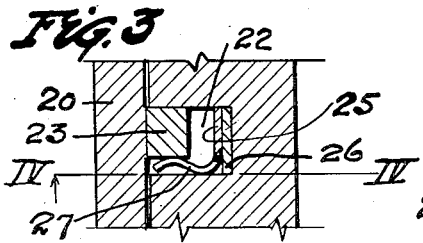
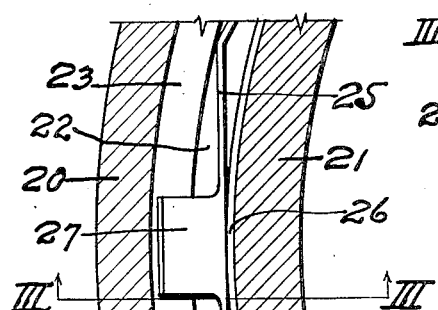
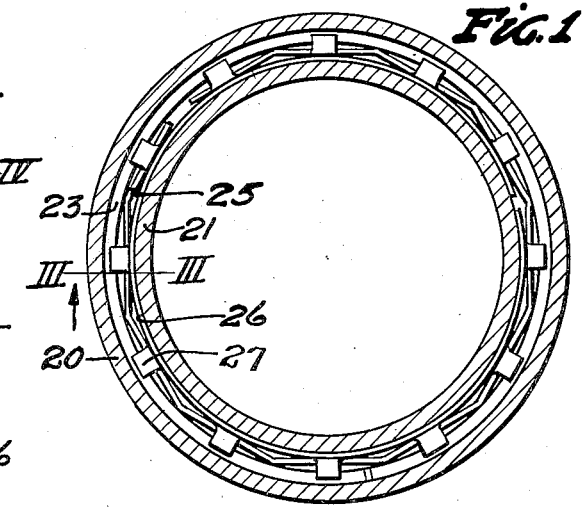
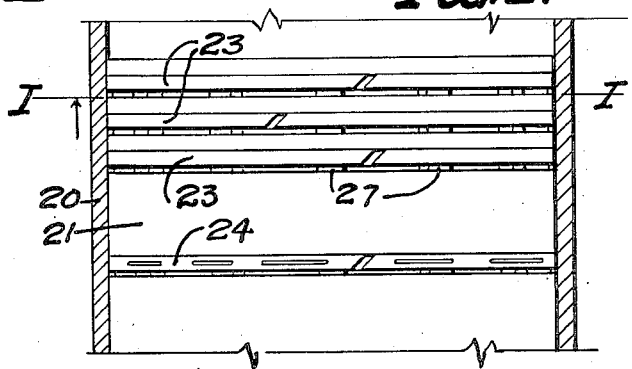
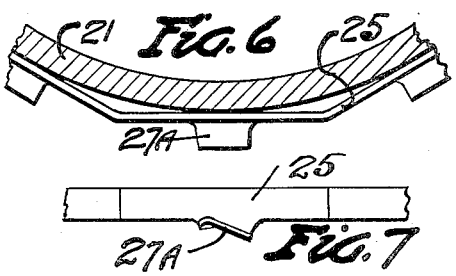
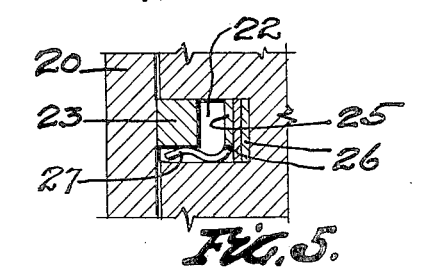
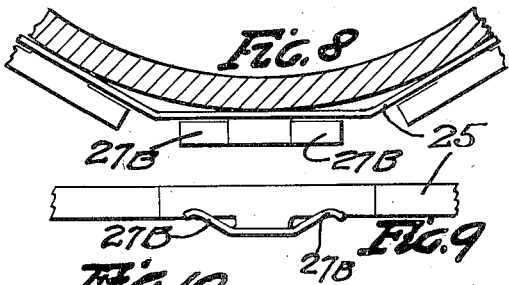
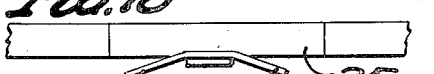
INVENTOR
FRITZ DEUTSCH
ATTORNEY Patented Feb. 9, 1932

1,844,214

UNITED STATES PATENT OFFICE

FRITZ DEUTSCH, OF MEMPHIS, TENNESSEE

PISTON RING EXPANDER

Application filed January 19, 1931. Serial No. 509,565.

This invention relates to piston rings and more particularly to means for expanding the rings radially against the walls of the cylinders, and for contacting them firmly with one side of the ring groove.

Engines depend for their efficiency largely upon the continued proper fit of the piston rings against the walls of the cylinders and particularly is this true of internal combustion engines. These latter engines are subjected to extremely severe service and are prone to wear more or less unevenly with the result that often times the rings have insufficient inherent expansibility to adjust themselves to this wear. It is found too in internal combustion engines that there is more wear at one end of the cylinder than the other so that adjustment of the rings is necessary during each stroke if tightness is to be had.

In order to accomplish this rings have been made thinner radially to give them greater flexibility and springs of various kinds ordinarily termed expanders have been placed in the grooves behind the rings in order to hold them against the wall of the cylinder. Because, however, of the shallow depth of the rings there is greater trouble in preventing gases from blowing radially inward between the ring and groove wall and thus escaping past the ring by going around and behind. This has been accentuated also by making the ring looser in the groove in order that full advantage might be had of the ring flexibility and of the expander.

In actual practice also, it is found that the depth of ring grooves varies to such an extent in auto engines of different manufacturers that expanders correct for one engine are too shallow or too deep for other engines, so that various kinds must be available in replacement work, thus practically preventing individual purchase and use.

The objects of my invention are:—

To provide means for adjusting groove depth whereby one depth of expander may be used with ring grooves of varying depths;

To provide a ring expander which will act radially upon the ring to secure radial expansion and which will act laterally upon the ring to contact it with a wall of the groove in which it is disposed;

A further object of my invention is to provide a ring expander of this type which does not require any special or unusual cross sectional shape of ring;

And further, to provide an expander which can be made up in long lengths and be cut off to fit any diameter of piston.

The means by which the foregoing and other objects are accomplished and the manner of their accomplishment will readily be understood from the accompanying drawings, in which:

Fig. 1 is a sectional plan taken on the line I—I of Fig. 2, looking in the direction of the arrow showing the cross section of an engine cylinder, and the piston therein, with a ring in one of the grooves of the piston and an expander of preferred type acting thereon;

Fig. 2 is a fragmentary sectional elevation on the center line of the same cylinder showing the upper end of the piston, with the rings, and expanders therefor;

Fig. 3 is an enlarged fragmentary sectional elevation taken as on the line III—III of Figs. 1 and 4, looking in the direction of the arrow;

Fig. 4 is a corresponding fragmentary plan on the same scale taken on the line IV—IV of Fig. 3, looking in the direction of the arrow;

Fig. 5 is a fragmentary sectional elevation corresponding to Fig. 3, showing a modification of the liner;

Figs. 6 and 7 are respectively plan and elevation of a portion of an expander of modified form;

Fig. 8 is a plan; and

Figs. 9 and 10 elevations of two additional modifications of an expander.

Referring now to the drawings in which the various parts are referred to by numerals, 20 is the cylinder wall and 21 the piston in the cylinder, which piston is provided with annular grooves or recesses 22 in which are disposed rings 23 and 24, the latter numeral indicating what is known as an oil ring. Disposed radially inward from the rings are flat strips of material 25 corrugated or crimped to form polygonal members or rings which are disposed in the grooves and which co-act with the bottom of the grooves to force the rings radially outward into contact with the wall of the cylinder.

Should the depth of the groove be such that the expander properly holds the ring against the cylinder wall the expander bears directly against the bottom of the grooves as shown in Figs. 6 and 8, should however the groove be of such depth that insufficient action is obtained I prefer to dispose between the expander and the bottom of the groove an auxiliary liner 26, which liner preferably is of such material as closely woven asbestos but which may be of cork treated to be heat resistant or even of metal which in such case would preferably be nonresilient so that it would easily and readily conform to the circle of the piston groove. The liner may be a single strip extending around the piston, or two or more strips or layers may be used, two such layers being shown by way of illustration in Fig. 5.

So far as this feature of the device is concerned the ring may be coextensive in width with the ring groove, and the expander and liner substantially coextensive with the ring. I prefer however to make the ring and expander of less width than the width of the groove and to form integral with the expander a series of tongues 27 bent outward substantially at right angles to the expander so that these tongues project into the space between the ring and the groove wall, and resiliently act to hold the ring against the opposite side of the groove. Preferably these tongues are of the shape shown in Figs. 1, to 5, in which the base of the tongues bear against one wall of the groove and the outer portion of the tongues against the ring, thus urging the ring against the opposite wall of the groove. The tongues however may be twisted as shown by the modified tongue 27A of Figs. 6 and 7 in which one outer corner of each of the tongues bears against the ring, and the other against the groove wall, or a form of tongue may be used, such as shown in Figs. 8, 9 and 10 such tongue having laterally extending ears 27B. In Fig. 9, these ears are shown turned upward so that they bear against the ring, and the body of the tongue against the groove wall, whereas in Fig. 10 the ears are oppositely bent, so that they bear against the groove wall and the body of the tongue against the ring.

It will be especially noted from Figs. 3 and 5 that that portion of the tongue which bears against the ring is rounded so that a smooth bearing is had against the ring and that as seen by Fig. 9 the ears projecting from the tongue which bear against the ring are similarly rounded, this being done in order that a minimum amount of resistance and/or scoring will be set up by the tongues or ears upon radial movement of the ring.

In installing rings and expanders the piston is removed from the cylinder and the depth of groove checked to determine whether the expander should be put in without a liner or with one, two, or even more layers of liner. If found necessary, such liner, or liners of proper length is or are placed in the groove and the expander and the ring placed around the liner. Preferably the cuts in liner, expander, and ring are positioned so that they do not aline or register. After all the rings are in place in the grooves the piston is replaced in the cylinder in the usual manner.

This procedure is followed whether the expander be provided with tongues and a narrow ring used, or whether the full groove-width ring be used.

It will be understood that the liner may be placed between the ring and the expander instead of between the expander and groove should it be desired, though it is believed the proper positioning is as shown.

Having described my invention, what I claim is:—

1. In an internal combustion engine, a piston having an annular recess in its peripheral wall, a ring in said recess, a spring therein for expanding said ring and a liner for adjusting the depth of said recess whereby springs of one depth may be used in recesses of varying depth, said spring comprising a polygonal member and together with said liner coacting with the inner surface of said ring and the bottom of said recess to urge said ring radially outward.

2. In an internal combustion engine, a piston having an annular recess in its peripheral wall, a ring in said recess a spring therein for expanding said ring and a liner for adjusting the depth of said recess, disposed between said spring and the bottom wall of said recess, whereby springs of one depth may be used in recesses of varying depth.

3. In an internal combustion engine, a piston having an annular recess in its peripheral wall, a ring in said recess, means therein independent of said ring for expanding said ring, and a liner for adjusting the depth of said recess, disposed between said spring and the bottom wall of said recess whereby means of one depth may be used in recesses of varying depth.

4. In an internal combustion engine, a piston having an annular recess in its peripheral wall, a ring in said recess of less width than said recess, a spring therein for expanding said ring, said spring substantially coextensive in width with said ring and a liner for adjusting the depth of said recess, said spring comprising a polygonal member having deformed tongues one for each polygonal side, each tongue extending radially outward between said ring and a side wall of said recess and resiliently urging same apart, said spring together with said liner coacting with the inner surface of said ring and the bottom wall of said recess to urge said ring radially outward, and said tongues with the side of said ring and said side wall to urge said ring against the opposite side wall of said recess.

5. In an internal combustion engine, a piston having an annular recess in its peripheral wall, a ring in said recess of less width than said recess, a spring therein for expanding said ring, said spring comprising a polygonal member having deformed tongues, one for each of said sides, said tongues extending radially into the space between said ring and a side wall of said recess, said tongues being deformed to resiliently bear against said ring and said side wall to urge same apart, said spring coacting with the bottom wall of said recess and the inner side of said ring to urge said ring radially outward, and said tongues with a side of said ring and said side wall to urge said ring against the opposite side wall of said recess.

6. In an internal combustion engine, a piston having an annular recess in its peripheral wall, a ring in said recess of less width than said recess, a spring therein for expanding said ring, said spring comprising a polygonal member having a plurality of sides lying between and engaging the bottom wall of said recess and the inner side of the ring, each of said spring sides having an integral tongue extending radially outward therefrom into the space between said ring and a side wall of said recess, said tongues being deformed to bear at spaced places against said side wall and ring respectively, whereby said spring will coact with the bottom wall of said recess and said ring to urge said ring radially outward and said tongues will coact with said ring and said side wall to urge said ring against the opposite side wall of said recess.

7. In an internal combustion engine, a piston having an annular recess in its peripheral wall, a ring in said recess of less width than said recess, and a spring in said recess for expanding said ring, said spring being substantially coextensive in width with said ring and comprising a polygonal member having a plurality of substantially straight sides lying between and engaging the bottom wall of the recess and the inner side of the ring; each of said sides having a tongue extending laterally and radially outward in ogee shape, the width across said spring and tongue adjacent the base of said tongue being substantially equal to the recess width, whereby said tongues extend outward between said ring and a side wall of said recess with the base of said tongues bearing against said wall and the outer portions thereof against the side of said ring.

8. A piston ring expander comprising a flat strip of spring metal bent into polygonal form, and having integral deformed tongues one for each of the sides of said polygon, said tongues each extending radially outward from an edge of a polygon side.

In testimony whereof I hereunto affix my signature.

FRITZ DEUTSCH.